March 2, 1965 — L. E. SODERQUIST — 3,171,162
PRESS FOR SHAPING AND CURING PNEUMATIC TIRES
Filed Dec. 8, 1961 — 6 Sheets-Sheet 1

INVENTOR.
LESLIE E. SODERQUIST
BY
ATTORNEYS

March 2, 1965     L. E. SODERQUIST     3,171,162
PRESS FOR SHAPING AND CURING PNEUMATIC TIRES
Filed Dec. 8, 1961     6 Sheets-Sheet 2

INVENTOR.
LESLIE E. SODERQUIST
BY
ATTORNEYS

INVENTOR.
LESLIE E. SODERQUIST

INVENTOR.
LESLIE E. SODERQUIST
BY Ely, Frye & Hamilton

ATTORNEYS

United States Patent Office 3,171,162
Patented Mar. 2, 1965

3,171,162
PRESS FOR SHAPING AND CURING PNEUMATIC TIRES
Leslie E. Soderquist, Silver Lake, Ohio, assignor to The McNeil Machine & Engineering Company, Akron, Ohio, a corporation of Ohio
Filed Dec. 8, 1961, Ser. No. 157,895
4 Claims. (Cl. 18—17)

The present invention relates to tire presses for shaping and curing unvulcanized tire bands within separable mold sections. More particularly, the invention relates to a center mechanism for shaping and curing an uncured tire band. Specifically, the invention relates to improved permanent bag center mechanisms located axially of a mold section for use in shaping a tire band and thereafter for curing the shaped tire band in toroidal form.

Center mechanisms according to the present invention, primarily intended for use in "Bag-O-Matic" presses, will be generally designated by the art as being of the permanent bag, bladder or diaphragm type; distinguishing from "bagless cure" center mechanisms in which pressure shaping and curing medium is in direct contact with the interior of the tire band. Early styles of center, forming or shaping mechanisms of the permanent bag type are disclosed in United States Patents No. 2,243,532 (Maynard) and 2,296,800 (Soderquist). Over the following years, continued development by the inventor of this aspect of "Bag-O-Matic" press construction resulted in slightly varied styles and configurations for permanent shaping and curing bags. See United States Patents No. 2,495,663 and No. 2,699,572. However, for many years, the inventor's permanent bag center mechanisms have been characterized by a deformable, radially distensible, rubber cylinder, open at both ends. The upper and lower ends of the bag have each been engaged and enclosed by a mating plate ring-bead ring assembly. Mechanical means have been provided to draw the rings together during closing of the press, to move the rings concurrently after the press starts to open to strip the cured tire from the lower mold section, and to spread the rings apart and extract the bag from the tire and extend the bag after the tire is out of contact with both mold sections.

Center mechanisms according to the present invention have a permanent bag in the form of a deformable, radially distensible, rubber cylindric cap but open only at the lower end. The closed upper end of the bag is specially contoured for engagement by a mold section during press closing and bag manipulation. The open lower end of the bag is engaged and closed by a novel plate ring-bead ring assembly. The bag is manipulated during closing of the press, stripping, extraction and extension by an improved actuating means.

Advantages of the improved center mechanism include the use of only one plate ring-bead ring assembly to clamp the bag for a wide range of tire sizes having the same bead diameter; quick replacement of a worn bag by improved clamping elements; a free floating piston and mechanical means for actuating bag stripping, extraction and extension and facilitating bag shaping during press closing; improved valve-type seals reducing leakage past the piston of the bag actuating means when at either extreme end of the operating stroke; a hub area in the ring assembly for clamping the bag constructed so that, if desired, specially shaped passages may be provided for quick removal of curing media or condensate at the end of a curing cycle.

Therefore, it is an object of the present invention to provide improvements and more efficient results, both in operation and maintenance, for permanent bag center mechanisms in tire presses having relatively movable mold halves. More specific objects, as well as more advantages of the invention, will become apparent in view of the following detailed description and the attached drawings.

Figure 7:
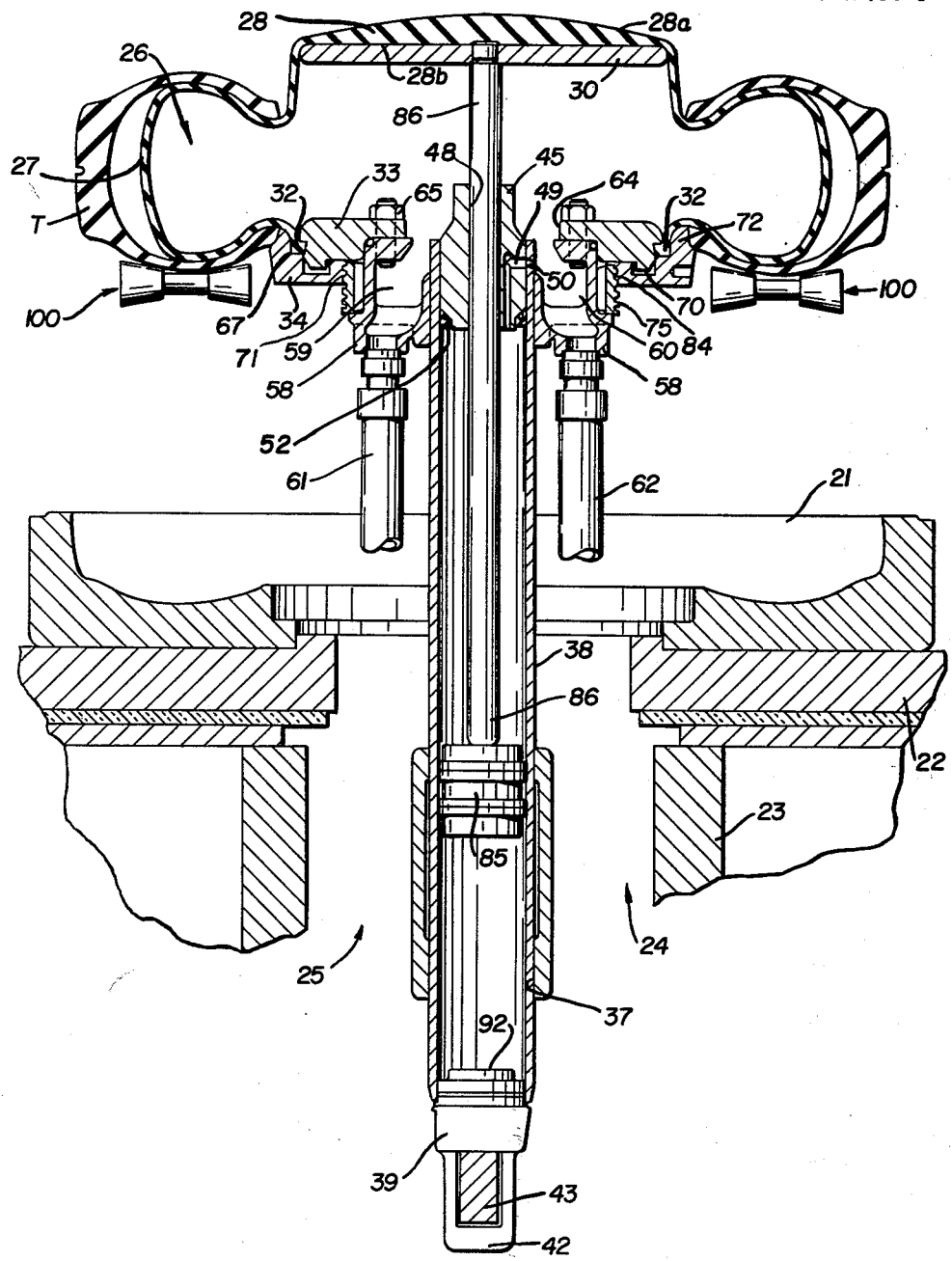
FIG. 7 is a side view, partly in section, showing the press open with the cured tire being supported by lifting arms and at the commencement of the operations of bag extraction and extension or elongation.
Figure 8:
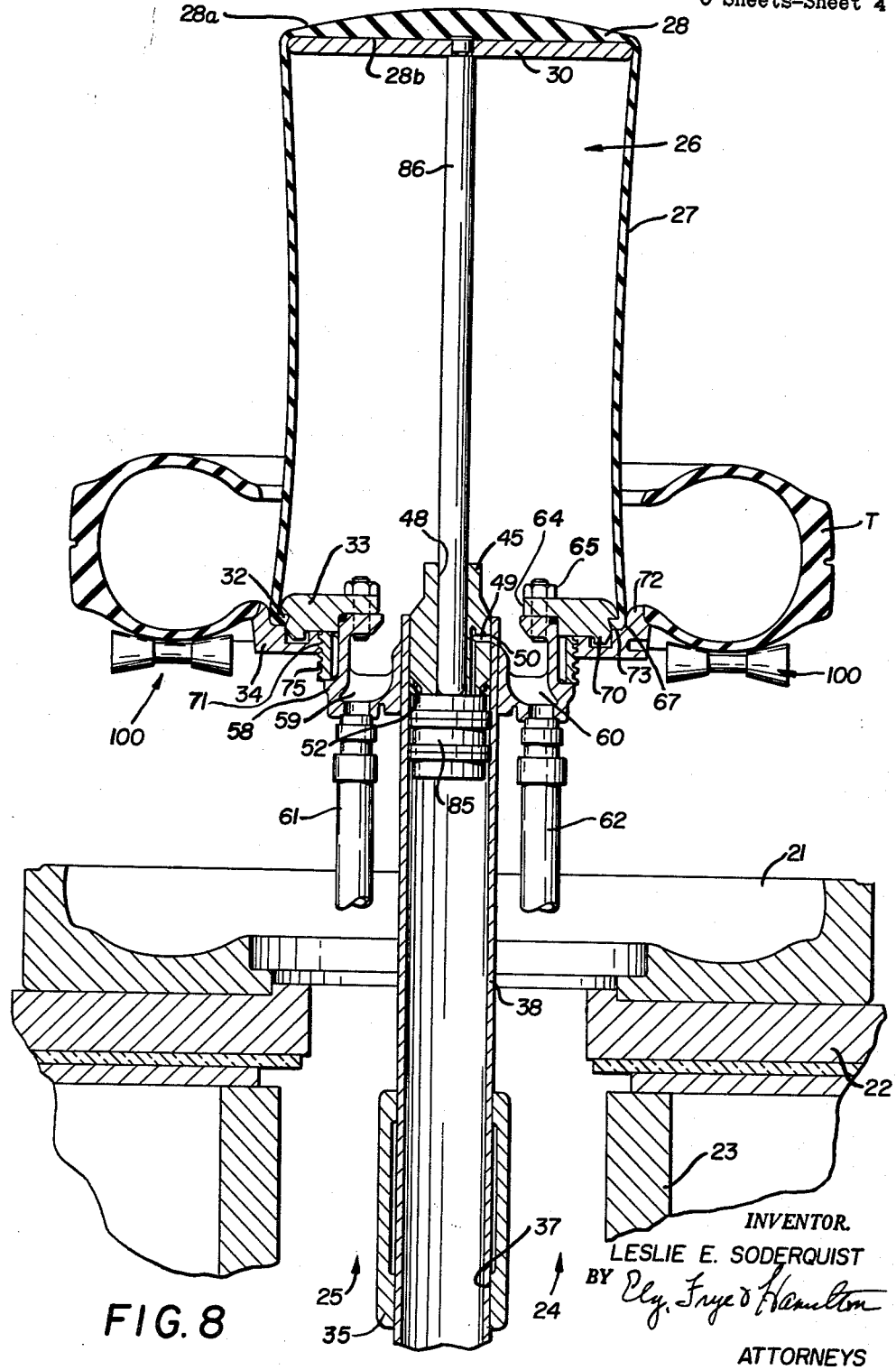
Figure 9:
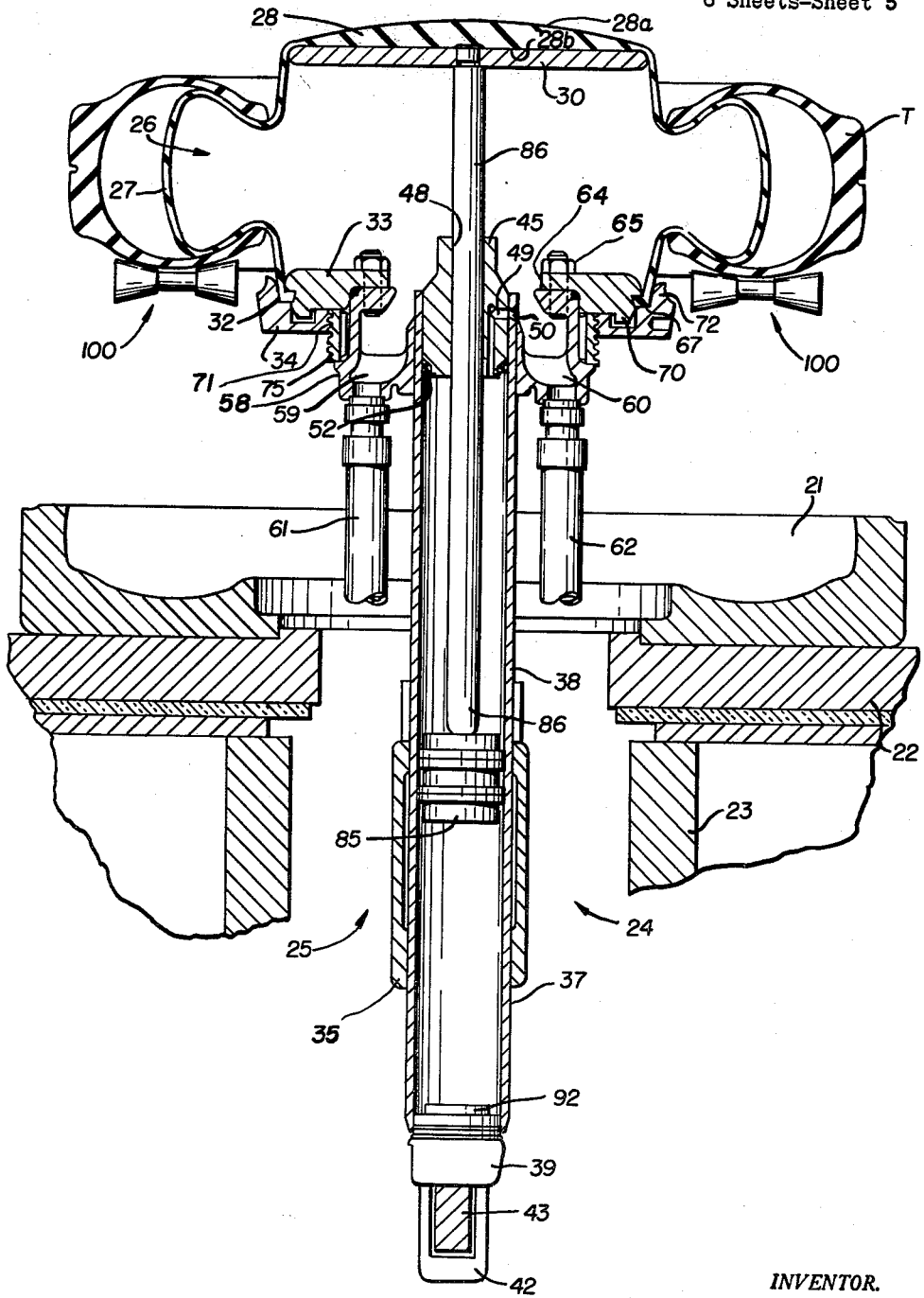
Figure 10:
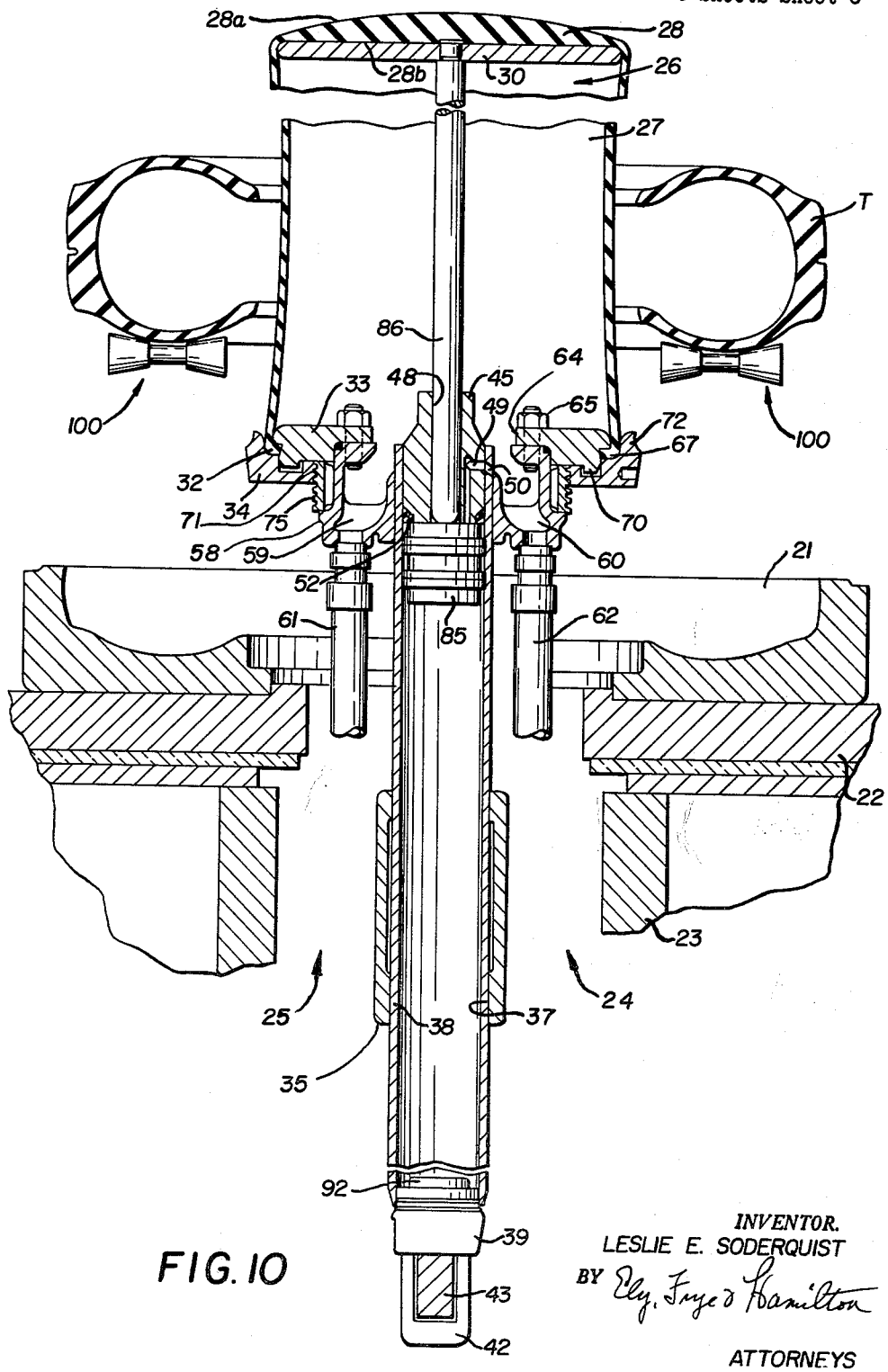

FIG. 8 follows FIG. 7 in sequence and shows completion of the operations of bag extraction and extension or elongation;

FIG. 9 is a view similar to FIG. 7 but showing the commencement of bag extraction by corresponding movements of the bag in opposite directions relative to the beads of the cured tire; and, FIG. 10 follows FIG. 9 in sequence and shows completion of the operations of bag extraction and extension or elongation.

General description

A tire curing press suitable for practice of the invention has separable upper and lower mold halves or sections, 20 and 21. The upper or movable mold sections or mold halves 20 are carried on and suitably attached to the under side of a conventional heavy cross beam (not shown) which extends across the press and constitutes one of the links of the operating mechanism by which the press is opened or closed. The lower or stationary mold sections 21 are mounted on conventional platens 22 attached to the base plate 23 of the press frame. Extending axially through the mold section 21, the platen 22 and the base plate 23 and down into the press frame is a passage or well, indicated at 24, accommodating lower portion of the improved center mechanism according to the invention, indicated generally at 25.

Press elements 20-24, described above, are shown in a number of prior art patents of the inventor, including United States Patent No. 2,808,618 to which reference is made for such details of presses as are required to more fully understand the invention. These presses are constructed so that it is possible to obtain a maximum "tilt-back" of the upper mold section and clearance above the lower mold section without loss of valuable head room above the press. This type of press is preferred, but it will be apparent that presses of other types and designs could be used in the practice of the invention, for example, presses in which the upper mold section is not moved entirely out of the way and to one side of the press, so long as the unvulcanized tire band (B) is appropriately located in relation to the center mechanism 25 before final shaping and curing as a tire (T).

The permanent bag, diaphragm or bladder 26 of an improved center mechanism is a deformable and radially distensible structure open at the lower end and initially elongate, having the shape or form of a cylindric cap. The bag 26 is manufactured from rubber, rubberized fabric or similar suitable materials known to the art, in a bag mold. It is preferred that the bag mold be designed so that the finished bag though cylindrical is also somewhat barrel shaped; that is, has a slightly enlarged medial portion so that the bag in use and when elongated, as described above, will collapse in four or more convolutions or folds.

Referring to the drawings, the side wall 27 of the bag is of substantially uniform thickness. The exterior surface of the side wall 27 may be suitably ribbed, grooved, or engraved in a known manner to facilitate exhaust of entrapped air between the tire band B and the expanding bag during shaping.

The upper or closed end 28 of the bag 26 is substantially thicker than the side wall 27, being what is best described as plano-convex in cross section. The convex upper surface 28a concentrically contacts, and is engaged during press closing, shaping and curing, by a concave mold plate 29 positioned axially of the upper mold section 20. The planar lower surface 28b contacts, and is engaged during bag extraction and elongation, by a substantially flat plate 30 of the bag actuating means.

Figures 3, 4:
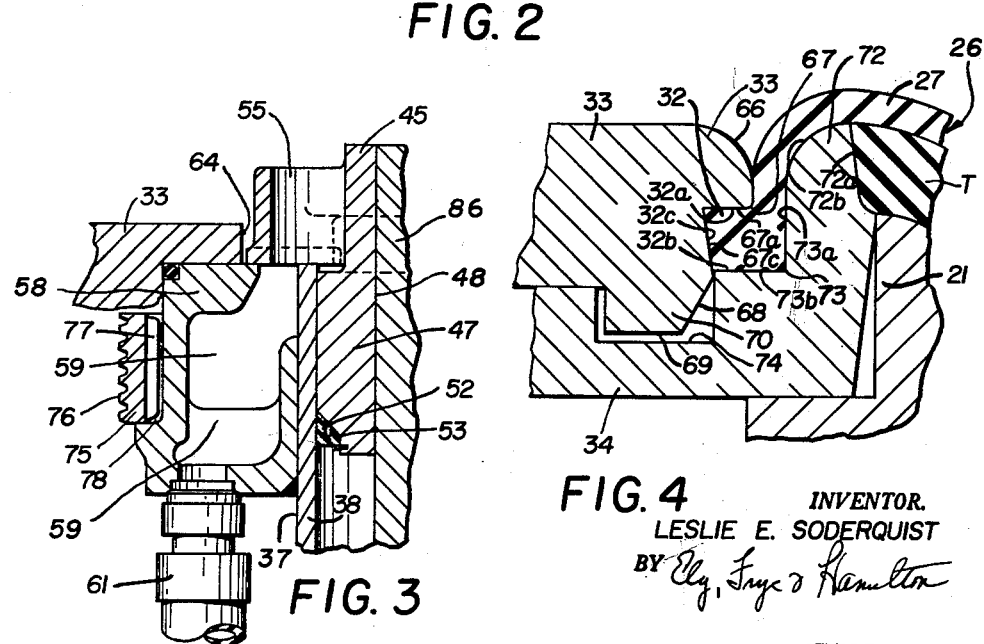
FIG. 3 is a fragmentary view, mainly in section, along the line 3—3 of FIG. 2.
FIG. 4 is an enlarged fragmentary section of the center mechanism in the condition of FIG. 1, to show details of the bag and the bag clamping elements.

As best shown in detail by FIG. 4 (sheet 2) the lower or open end of the bag 26 has an annular configuration best described as an L-shaped radially inwardly directed flange 32 intended to be confined and sealed between cooperating surfaces on a plate ring 33 and a bead ring 34. The upper and lower flange surfaces, 32a and 32b respectively, are flat and preferably parallel terminating in a preferably downwardly and axially outwardly inclined or tapered end flange surface 32c. The upper and end flange surfaces 32a and 32c are seated within a peripheral notch on a circular plate ring 33. The lower flange surface 32b is seated by an annular shelf surface on a bead ring 34.

Figures 1, 5, 6:
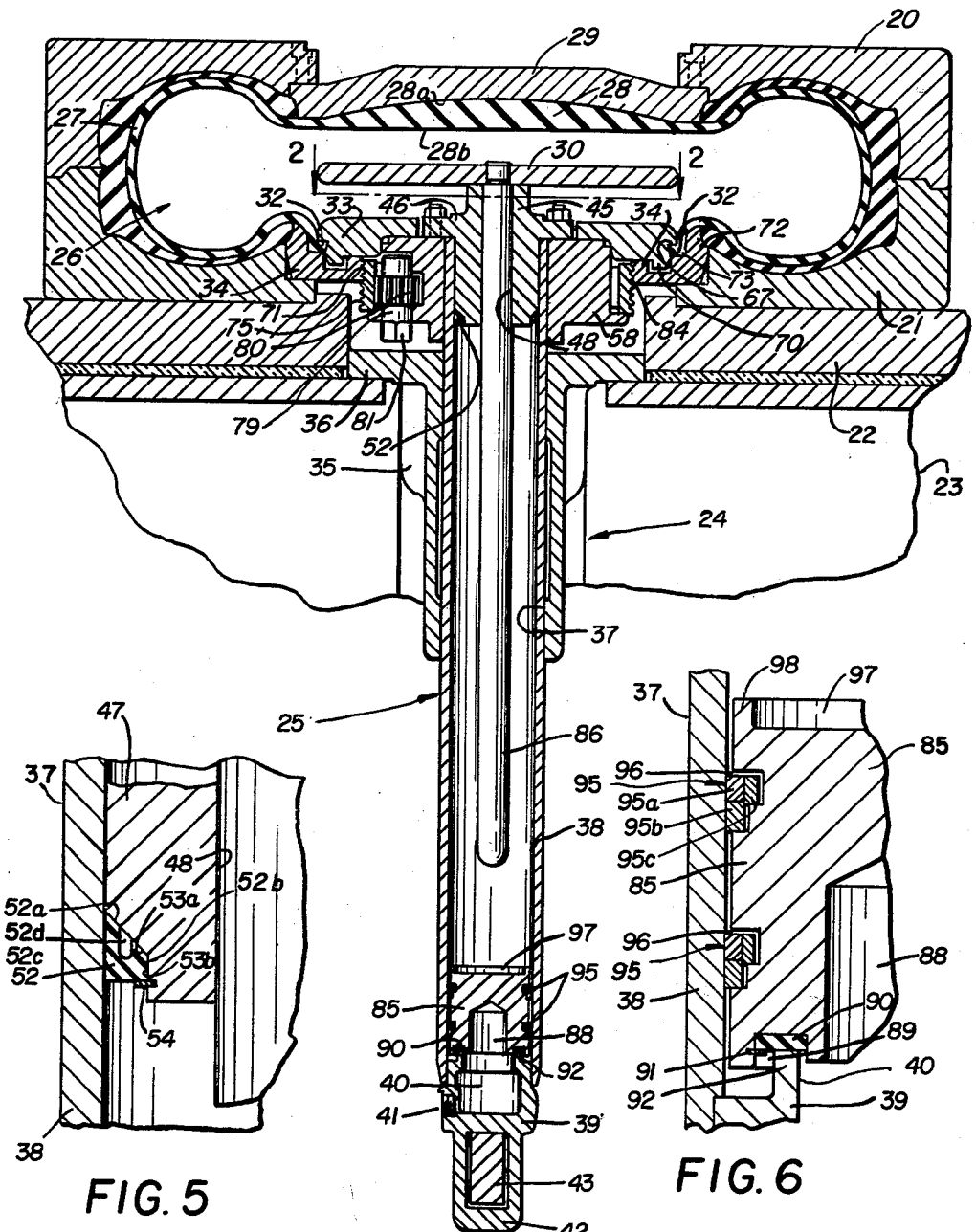
FIG. 1 is a side view, taken in section substantially as indicated on line 1—1 of FIG. 2, showing the press mold sections when closed with the improved center mechanism in curing relation to a tire.
FIG. 5 is another enlarged fragmentary section showing details of the improved valve-type seal provided at the upper end of the actuating cylinder of the center mechanism.
FIG. 6 is still another enlarged fragmentary section showing details of the improved floating piston in the actuating cylinder of the center mechanism.

Referring to FIG. 1, a stationary member 35 of the center mechanism extends downwardly through the press base well 24. The upper end of the stationary member or cylinder guide 35 has a flange 36 securely attached by suitable means (not shown) to the press frame 23 adjacent the platen 22. Extending axially through the member 35 is a machined bore 37 slidably engaging the outer surface of a cylinder tube 38.

Fitted into the lower end of the cylinder tube 38 is a closure cap 39 having a pressure fluid chamber 40 communicating through an orifice 41 with a suitable conduit or line (not shown). The lower end of the closure cap 39 has a socket or stirrup 42 receiving the movable element 43 of an actuating mechanism for elevating the bead ring 34 to strip cured tires T from the lower mold section 21. Details of a suitable mechanism for selectively raising or lowering element 43 have not been shown herein; reference being made to prior art patents of the inventor, including United States Patents No. 2,495,663, No. 2,699,572, No. 2,715,245 and No. 2,836,847, for such details of suitable mechanisms as are required to more fully understand the invention.

Fitted into the upper end of the cylinder tube 38 is a hub member 45 having a radially extending flange portion 46. The body portion 47 of the hub is received within the cylinder tube and has a machined axial bore 48 slidably receiving the piston rod actuating the bag plate 30. As shown in FIG. 8, the hub body 47 also has at least one internal conduit 49 communicating through an orifice 59 in the upper end of the cylinder tube 38 with the pressure fluid manifold of the center mechanism.

Referring to FIG. 5 (sheet one), the lower end of the hub body 47 has a bevelled reduced diameter configuration to provide the seat for a valve type trapezoidal seal 52. The seal 52 is formed of a suitable gasket material, e.g. "Teflon," which is durable, resistant to mechanical and thermal shock, long lived or non-perishable, etc. The bevelled or downwardly and axially inwardly inclined surface 52a of the seal mates against a corresponding surface 53a on the hub body 47. The surface 52a is preferably bevelled at an angle of 45° and, as shown, is preferably provided with an annular, deep groove 52d to render the seal 52 less rigid, or more flexible, during the operative conditions described hereafter. The inner surface 52b of the seal mates against a corresponding surface 53b on the hub body 47. The outer surface 52c seals against the inner surface of the cylinder tube 38. The seal 52 is maintained against the hub body seat 53 by a clip ring 54.

Figure 2:
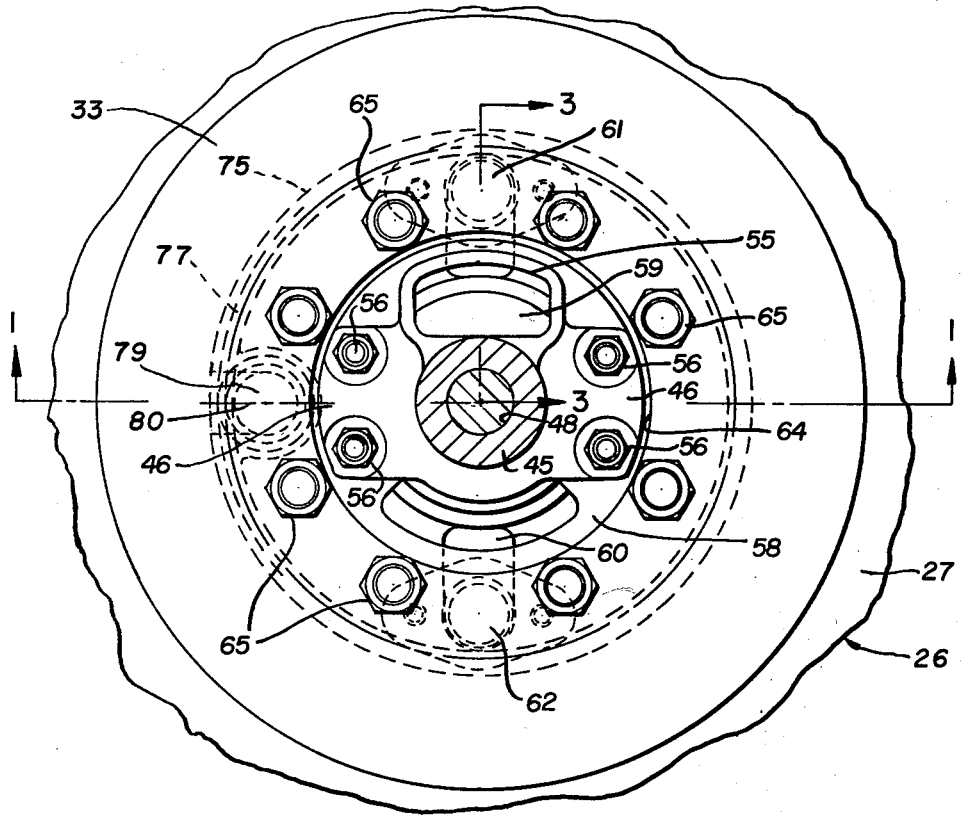
FIG. 2 is an enlarged plan view, taken substantially as indicated on line 2—2 of FIG. 1.

Referring to FIGS. 2 and 3, the hub member 45 may, if desired, be provided with a dam element 55 to one side of or at an approximate 90° angle to the radially extending flange portions 46. The dam 55 has elevated walls extending circumferentially around one, of the preferably two, passages providing for communication between the pressure fluid manifold and the interior of the bag 26. It has been found that under certain operating conditions, as determined by the variables of press open time, pressures and temperatures of the shaping and curing media, the size of service drain headers and vacuum lines, and other characteristic environmental factors of actual press operation, that removal of condensate or condensed curing media and collapse of the bag 26 is facilitated by use of the dam 55 surrounding a drain passage. The dam 55 is sufficiently high (e.g. 2 inches) to provide a "head" or level of condensate which can only go to the other or undammed passage. When, as described in further detail below, the dam is above the passage communicating directly to drain, any vacuum applied through the undammed drain passage will result in a more efficient and rapid discharge of condensate and collapse of the bag.

As best shown in FIG. 2, extending downwardly through the hub flange portion 46 are a series (four shown) of stud bolts 56 for mounting the pressure fluid manifold 58. Referring to FIG. 8, the manifold 58 is a central member extending radially around the cylinder tube 38 and the hub member 45 and having preferably opposed pressure fluid chambers 59 and 60. The upper end of each chamber 59 and 60 opens into the interior of a bag 26 close to or adjacent the hub member 45. The lower end of chamber 59 is suitably adapted for connection to a service line 61. For purpose of disclosure, line 61 is considered as being the conduit communicating with the selectively valved press service line (not shown) for connection to drain. The lower end of chamber 60 is similarly adapted for connection to a service line 62. Line 62 is considered as being the connection for communication with the selectively valved press service lines (not shown) for connection to sources for vacuum, shaping media and curing media.

The plate ring 33, referred to above, is a circular member having an outer diameter substantially the same as the diameter of the flat plate 30 of the bag actuating means and an axial bore 64 which is suitably relieved to accommodate the hub flanges 46 and provide access to the openings into manifold chambers 59 and 60. As best shown in FIG. 2, extending downwardly through the area adjacent the axial bore 64 are a series (eight being shown) of stud bolts 65 for attachment of the ring 33 to the upper or outer surface of the manifold 58.

Referring to FIG. 4, the preferably rounded upper corners 66 defining the periphery of a plate ring 33 provide smooth surfaced contact with the wall 27 of a bag when extended. The periphery of a ring 33 is provided with a notch 67 having suitably shaped surfaces, preferably flat and parallel, 67a and 67c, for seating the upper and end flange surfaces 32a and 32c, of the bag 26. Below the downwardly and axially outwardly inclined or tapered ring surface 67c is an axially inwardly inclined or oppositely tapered surface 68. The surface 68 terminates in a preferably horizontal surface 69. As described in detail below, the intersecting surfaces 68, 69 define the radially outer portions of an annular ring 70 having a tapered diameter less than the diameter of the bag flange 32, measured from end surface 32c, so as to facilitate fitting and positioning of a replacement bag 26.

The bead ring 34, referred to above, is an annular member having the functions of molding a surface of the tire bead during the curing operation, of stripping the cured tire T from the lower mold section 21 as the press opens after cure, and in cooperation with the plate ring 33 clamping and sealing the open end of the bag 26. The bead ring 34 has a threaded large diameter axial bore 71 and a peripheral flange 72.

Referring to FIG. 4, the outer flange surface 72a is suitably shaped to provide the molding surface for the radially innermost areas of the bead of a tire and to support the tire during the stripping operation after cure. The rounded inner flange surface 72b provides smooth surfaced contact with the wall 27 of a bag during shaping, curing and the beginning of extraction. Below the surface 72b is a shelf 73 having suitably shaped surfaces 73a and 73b, for seating the lower wall 27 and the lower flange surface 32b of the bag 26. Below and radially inwardly of surface 73b, the ring 34 is machined to provide an annular groove 74 dimensioned to provide clearance for the ring 70 when the bead ring 34 is moved against the plate ring 33.

The bead ring 34 is moved vertically and adjusted with relation to the plate ring 33 by a ring or annular gear member 75 selectively rotatable around the manifold 58. The outer surface of the ring member 75 is machined to provide a continuous peripheral thread 76. The interior surface of ring member 75 is machined to provide continuous internal spur gear teeth 77. The ring member 75 rests upon and is supported in a horizontal plane by a shelf 78 provided on the outer surface of the manifold 58. Any upward movement of member 75 is united by the plate ring 33. The ring member 75 is selectively rotated around the manifold 58 by a manually actuated pinion 79 journaled in the manifold having teeth 80 continuously engaging the spur gear teeth 77. The pinion 79, preferably located so that the pinion is presented to the front of the press, has a square head or driver 81 for engagement by a suitable wrench or other hand tool. The external thread 76 of the ring member 75 is in continuous mating engagement with corresponding internal threads 84 around the axial bore 71 of the bead ring 34. Thus, when the pinion 79 is manually rotated, the ring member 75 will also rotate driving the bead ring 34, depending upon the direction of rotation, toward or away (up and down) from the plate ring 33.

The bag actuating plate 30 is raised for bag extraction and elongation by a free or floating piston 85 selectively contacting the depending or lower end of a piston rod 86 slidably received in the hub bore 48. Referring to FIG. 6, the lower surface of the piston 85 is preferably bored to provide a chamber 88 communicating with the pressure fluid chamber 40 in the cylinder closure cap. Radially of chamber 88 is an annular groove 89. Within the groove 89 is a seal 90, retained by a clip ring 91, preferably formed of a similar material (e.g. "Teflon") as the trapezoidal seal 52. The seal 90 provides a seat for an annular flange 92 on the upper surface of the closure cap 39.

During movement between the upper and lower ends of the cylinder tube 38, the piston 85 is sealed by preferably two sets of circumferential rings indicated at 95. Referring to FIG. 6, each set of rings 95 is accommodated in a suitably shaped groove 96, machined in the piston wall, and comprises three rings. The stacked upper and lower outer rings, 95a and 95b, are backed up by an inner ring 95c having a width sufficient to overlap the joint between rings 95a and 95b. The rings 95 are preferably stainless steel, fabricated with a lap joint (not shown) and having an inherent radially outward bias or tension so that the outer rings will have uniform full surface contact and will apply a wiping pressure against the walls of the cylinder tube.

The upper surface of the piston 85 has a circular recess 97 with a depth sufficient to permit the flange 98 defined by the recess to fully seat against the trapezoidal seal 52 around the hub member 45, for shutting off or preventing communication of internal hub conduit 49 with the interior of the cylinder tube 38.

*Press operation*

Referring to FIG. 1, when the press mold sections are closed the center mechanism 25 is in curving relation to a tire T, the bag 26 is radially distended within the shaped and curing tire, curing media is being supplied through manifold chamber 60 and service line 62. The plate 30 is seated on hub member 45. The piston 85 is seated on the cap flange 92 by the pressure of the curing media, which has entered through hub body conduit 49 within the cylinder tube 38.

At the end of the curing period, the press is actuated by a suitable control means, such as a timer (not shown), to open. Prior to opening, the press control means has cut off supply of curing media to manifold chamber 60, and has opened the valve in line 61 connecting the manifold chamber 59 to drain.

As the press opens, it is preferred that the operations of stripping the cured tire T from the lower mold section 21 and extracting the bag 26 from within the tire T are commenced concurrently or substantially simultaneously. Thus, when the upper mold section has moved away, the movable element 43 of the stripping mechanism is raised moving the cylinder tube 38 longitudinally within the guide bore 37 for elevating the bead ring 34 to strip the cured time T from the lower mold section. As the tire T begins to strip, pressure fluid (e.g. water at 250 p.s.i.) is applied through the cap chamber 40 and orifice 41. The piston 85 raises from the seat on the cap flange 92 and contacts the lower end of piston rod 86. As the rod 86 is raised by the piston the upper surface of the actuating plate 30 contacts bag surface 28b gently but firmly beginning extraction of the bag 26 from within the tire T.

FIG. 7 shows the condition of the center mechanism 25 after stripping of the tire and the beginning of extraction of the bag 26.

In FIG. 7, and also in FIGS. 8, 9 and 10, it is shown how the under side of the cured tire T may be, if desired, contacted during the described operations by a mechanism having arm means indicated at 100. Details of a suitable mechanism for moving arm means 100, as desired or required for the operations of tire stripping, bag extraction and extension, and removal or discharge of the tire from the press, have not been shown herein; reference being made to prior art patents of the inventor, including United States Patent No. 2,495,663, No. 2,832,-991, No. 2,832,992, and No. 2,911,670, for such details of suitable mechanisms as are required to more fully understand the invention.

Referring to FIG. 8, when the bag 26 is extracted from within the tire T and fully collapsed and extended for removal of the tire by the arm means 100, the piston 85 will be seated against the hub seal 52. The pressure against the piston 85 is maintained while the cured tire T is discharged and during subsequent loading of an uncured tire band into the press and over the elongated bag 26.

It will be noted by a comparsion of FIG. 1 with FIG. 7 that the piston 85 has a significant distance to travel, a "lost motion," before contact with the piston rod 86. Comparing FIG. 1 with FIG. 8, it will be noted that the length of piston rod 86 is sufficient to extend the bag 26 to its fully elongated position when the upper surface 97 of the piston 85 is against the lower surface of the hub member 45. To provide the requisite "lost motion" for substitution of a longer piston rod 86 for larger tires, the travel of actuation plate 30 in extending the bag 26 is less than the maximum stroke of the piston, the distance between the upper surface 97 of the piston 85 when "bottomed" on flange 92 and the lower surface of hub member 45. It is preferred that the cylinder tube 38 be dimensioned sufficiently long to accommodate any reasonable length piston rod 86 and that the actual length or lineal dimension of a rod 86 be determined by the height of the bag 26 when elongated. Thus, if the bag 26 were to be replaced with a longer or higher bag for curing a larger tire size of the same bead diameter, (for example, converting the press from curing a 6.50 x 14 to curing an 8.10 x 14), the only elements of a center mechanism 25 requiring change would be the replacement bag, and a plate 30-piston rod 86 assembly in which the rod 86 had a corresponding greater length or increased lineal dimension. This is an important advantage in providing versatility and efficiency in press operation.

Furthermore, an old or replaced bag is quickly removed by raising the mechanism 25 to an elevated position, selectively rotating the pinion driver 81 and the ring member 75 to move the bead ring 34 away from the plate ring 33. As has been described above, the flange surfaces 32 of a bag 26 are confined and sealed by the cooperating surfaces provided by the plate ring notch 67 and bead ring shelf 73. Lowering of the bead ring readily permits demounting of the old bag 26. The new or replacement bag 26 is then buttonholed over the plate ring with the bag flange 32 beneath the notch 67 and resting on shelf 73. The pinion driver 81 is then rotated in the opposite direction to move the bead ring toward the plate ring. As the bead ring 34 raises the tapered surface 68 the annular ring 70 uniformly stretches the bag flange 32 outwardly to positively ensure a concentric and uniform fit within the notch 67. The ease of bag change, as just described, is a marked improvement over the art and clearly provides advantages for press operation.

Comparing FIG. 9 with FIG. 7, the bag 26 may also be extracted from within the tire T by a concurrent or simultaneous raising of the piston 85 from the cap flange 92 and lowering of the movable element 43 of the stripping mechanism. This mode of operation is used when it is desired or necessary to maintain the tire T medially of the bag 26 during full extraction and elongation, as for example, when the beads of the cured tire T are to be utilized to provide a positive restraint ensuring collapse of the bag into four or more convolutions or folds. FIG. 10 follows in sequence after FIG. 9 and shows the bag 26 extracted from within the tire T and fully extended and collapsed for removal of the tire T and loading of an uncured tire band.

After loading of an uncured tire band over the elongated bag 26 (an operation not shown), the press closes, bringing the concave upper mold plate 29 toward and eventually into contact with the closed end 28 of the bag. It is preferred that the exhaust of the pressure fluid which had been supplied through the cylinder cap chamber 40 to raise the piston 85 and actuation plate 30 be valved or metered to provide a resistance to lowering of the bag actuation plate 30 ensuring a gradual and uniform movement of the upper end 28 of the bag with relation to the upper bead of the uncured tire band. This feature is particularly advantageous in the shaping and curing of preformed or dual bead tires, and is often referred to by the art as the "double stacking height" feature; reference being made to prior art patents of the inventor, including United States Patent No. 2,997,738 and No. 2,699,572 for such details of this technique as are required to more fully understand this advantage of the invention.

After the upper mode plate 29 has contacted the bag, but before the mold sections have fully closed, it is preferred that the shaping media be applied through line 62 and the manifold supply chamber 60 into the interior of the bag. When the shaping media is applied, an amount of pressure sufficient to bottom the piston 85 on the cap flange 92 will enter the cylinder tube 38 through the orifice 50 and internal hub conduit 49.

The above description and accompanying drawings are considered sufficient to enable one skilled in the art to understand the principles and workings of the press and center mechanism 25 according to the invention. However, it will be appreciated that the details are not essential and may be varied or modified within the scope of the advance in the art and the appended claims. Further, while the invention has been shown and described in connection with one pair of mold halves or sections, the principles thereof could be used in dual presses. Also, no showing has been made of any wiring diagram and switches by which closing of the mold halves, admission of the shaping and curing media, circulation of air or application of vacuum to the bag interior, elevation of the cylinder tube 38, etc., are automatically controlled, since such details may be readily designed by any qualified electrical engineer when the sequence of operations as described herein is understood.

What is claimed is:

1. In a tire press having a center mechanism for shaping and curing tires within relatively movable mold halves: said center mechanism comprising; a hub member (45) located axially of a mold section, a central member located radially of said hub member, a peripherally threaded ring member rotatable around said central member, a circular member attached to said central member outwardly of said ring member, an internally threaded bead ring engaging said ring member, means to rotate said ring member to move said bead ring toward and away from said circular member, and a deformable radially distensible cylindric cap diaphragm, said circular member and bead ring having cooperating surfaces for clamping and sealing said diaphragm, a diaphragm actuating means comprising; a cylinder tube (38) extending axially of said hub member through said central member, a piston rod (86) extending axially of said cylinder tube and projecting through said hub member into the interior of said bag, a substantially flat actuation plate (30) attached to the projecting end of said piston rod, a floating piston (85) within said cylinder tube, and means (40, 41) for applying pressure fluid to said piston to move said piston rod and said flat plate away from said circular member.

2. A tire press center mechanism according to claim 1 in which said central member is a manifold (58) having fluid pressure chambers (59, 60) opening into the interior of said diaphragm, there is an internal conduit (49) through said hub member communicating with the interior of said cylinder tube above said piston, and there is an orifice (50) connecting said internal conduit with one of said chambers.

3. A tire press center mechanism according to claim 2 in which the end of said hub member (45) within the cylinder tube (38) has a reduced diameter seat for a seal (52), said seal being adapted when contacted by said piston to prevent communication of the internal conduit (49) with the interior of said cylinder tube.

4. A tire press center mechanism according to claim 1 having a diaphragm actuating means in which the piston rod has a lineal dimension sufficient to fully extend the diaphragm, and the flat actuation plate has a travel distance which is less than the maximum stroke of the piston.

References Cited by the Examiner
UNITED STATES PATENTS

| | | | |
|---|---|---|---|
| 2,358,763 | 9/44 | Soderquist | 18—2 |
| 2,715,245 | 8/55 | Soderquist | 18—17 |
| 2,730,763 | 1/56 | Brundage | 18—17 |
| 2,747,225 | 5/56 | Zona | 18—2 |
| 2,775,789 | 1/57 | Soderquist | 18—17 |

MICHAEL V. BRINDISI, *Primary Examiner.*

UNITED STATES PATENT OFFICE
CERTIFICATE OF CORRECTION

Patent No. 3,171,162                                        March 2, 1965

Leslie E. Soderquist

It is hereby certified that error appears in the above numbered patent requiring correction and that the said Letters Patent should read as corrected below.

Column 2, line 51, after "accommodating" insert -- the --; column 5, line 33, for "united" read -- limited --; column 7, line 13, for "corresponding" read -- correspondingly --; line 51, for "concove" read -- concave --; same column 7, line 68, for "mode" read -- mold --; column 8, line 47, for "fluid pressure" read -- pressure fluid --.

Signed and sealed this 17th day of August 1965.

(SEAL)
Attest:

ERNEST W. SWIDER                                  EDWARD J. BRENNER
Attesting Officer                                     Commissioner of Patents